United States Patent [19]

Focke et al.

[11] Patent Number: 5,292,060
[45] Date of Patent: Mar. 8, 1994

[54] FOLDING CONTAINER

[75] Inventors: Heinz Focke, Verden; Harald Gosebruch, Hanover, both of Fed. Rep. of Germany

[73] Assignee: Focke & Co. (GmbH & Co.), Verden, Fed. Rep. of Germany

[21] Appl. No.: 889,238

[22] Filed: May 28, 1992

[30] Foreign Application Priority Data

May 29, 1991 [DE] Fed. Rep. of Germany ....... 4117663

[51] Int. Cl.5 ............................................. B65D 5/42
[52] U.S. Cl. ................................. 229/198.1; 220/683; 220/685; 229/23 BT; 229/198.3
[58] Field of Search ......... 229/23 BT, 117.05, 125.39, 229/198.1, 198.2, 198.3; 220/4.29, 683, 685

[56] References Cited

U.S. PATENT DOCUMENTS

| | | | |
|---|---|---|---|
| 1,481,592 | 1/1924 | Dozier | 229/117.05 |
| 2,089,405 | 8/1937 | Newkirk | 229/198.1 |
| 2,144,318 | 1/1939 | Kryder . | |
| 2,315,851 | 4/1943 | Goldman | 229/198.1 |
| 2,722,366 | 11/1955 | Carlson | 229/198.1 |
| 2,993,637 | 7/1961 | Lacey | 229/198.1 |
| 2,994,466 | 8/1961 | Thompson | 229/198.1 |
| 3,076,588 | 2/1963 | Conway et al. | 229/125.39 |
| 3,391,848 | 7/1968 | Schmidt | 229/198.1 |
| 3,642,192 | 2/1972 | Wilcox, Jr. et al. | 229/117.05 |
| 3,651,975 | 3/1972 | Callan | 220/4.29 |
| 3,739,833 | 6/1973 | Rausch et al. | 220/685 |
| 4,753,348 | 6/1988 | Patrick et al. . | |
| 4,828,132 | 5/1989 | Francis, Jr. et al. . | |
| 4,844,262 | 7/1989 | Patrick et al. | 229/23 BT |
| 4,848,651 | 7/1989 | Hartness | 229/23 BT |
| 4,896,787 | 1/1990 | Delamour et al. . | |
| 5,042,713 | 8/1991 | Stafford | 229/198.2 |

FOREIGN PATENT DOCUMENTS

| | | | |
|---|---|---|---|
| 53232 | 6/1982 | European Pat. Off. . | |
| 0216975 | 4/1987 | European Pat. Off. . | |
| 306381 | 3/1989 | European Pat. Off. . | |
| 7044919 | 12/1970 | Fed. Rep. of Germany . | |
| 1761338 | 5/1971 | Fed. Rep. of Germany . | |
| 1586642 | 4/1975 | Fed. Rep. of Germany . | |
| 2750849 | 5/1979 | Fed. Rep. of Germany . | |
| 3339292 | 5/1984 | Fed. Rep. of Germany . | |
| 1188208 | 9/1959 | France . | |
| 534398 | 3/1958 | Italy | 229/198.1 |
| WO9011225 | 10/1990 | PCT Int'l Appl. . | |
| 826680 | 1/1960 | United Kingdom | 229/198.1 |
| 1583324 | 1/1981 | United Kingdom . | |

*Primary Examiner*—Gary E. Elkins
*Attorney, Agent, or Firm*—Sughrue, Mion, Zinn, Macpeak & Seas

[57] ABSTRACT

Folding containers as packaging for relatively large bundles are conventionally sent to the refuse tip (damp) after use. The invention is to provide a reusable and largely recyclable folding container. For this, at least the side walls (11 to 14) made of plastic are designed with hinge strips (30), consisting of the same or a similar material, for the connection of said side walls. A version with a so-called tray is also possible. In this case, one part of the folding container consists of paperboard and serves for receiving smaller packs, whilst another part, made of plastic as described previously, is designed with hinge strips and is therefore reusable.

14 Claims, 6 Drawing Sheets

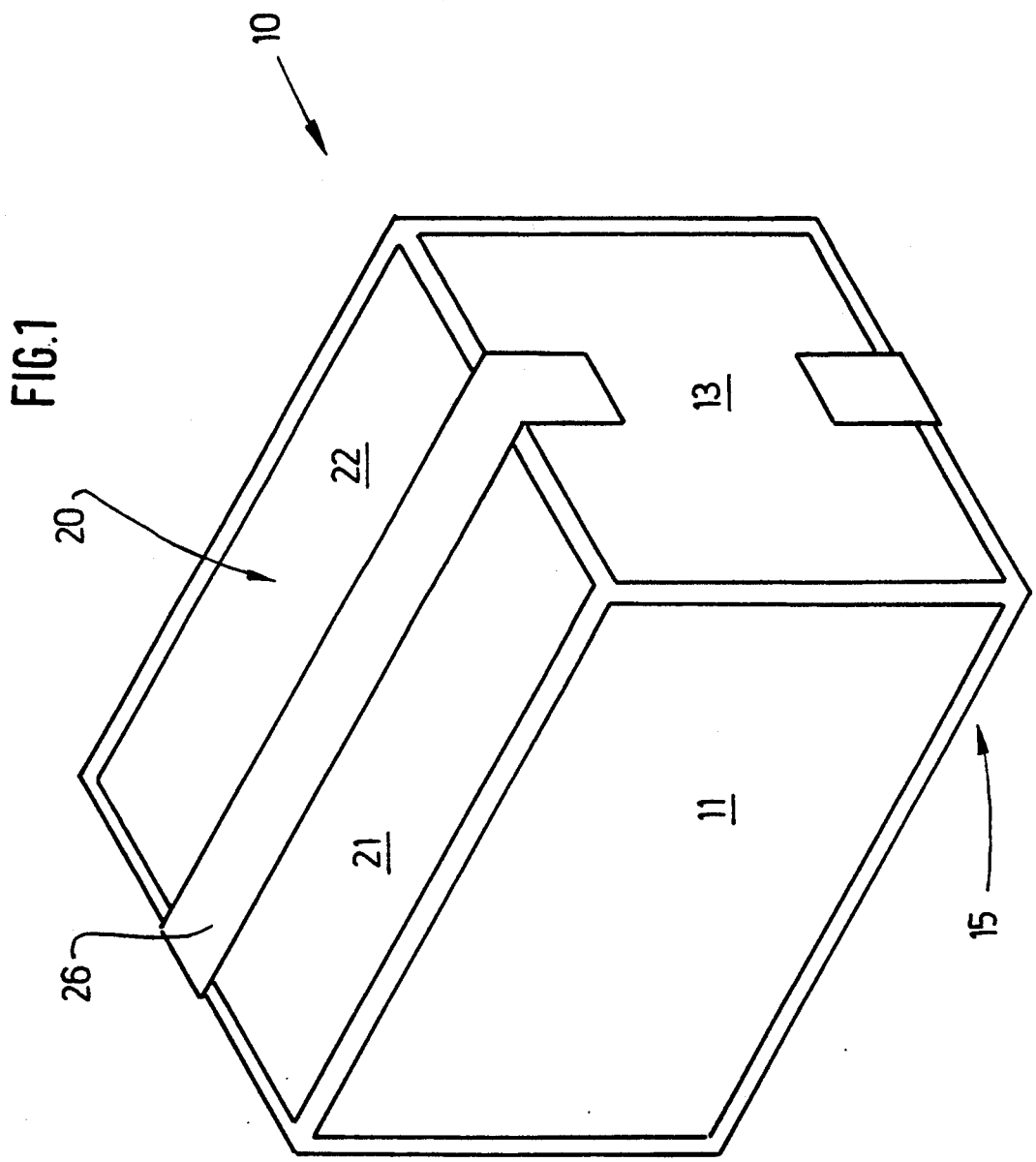

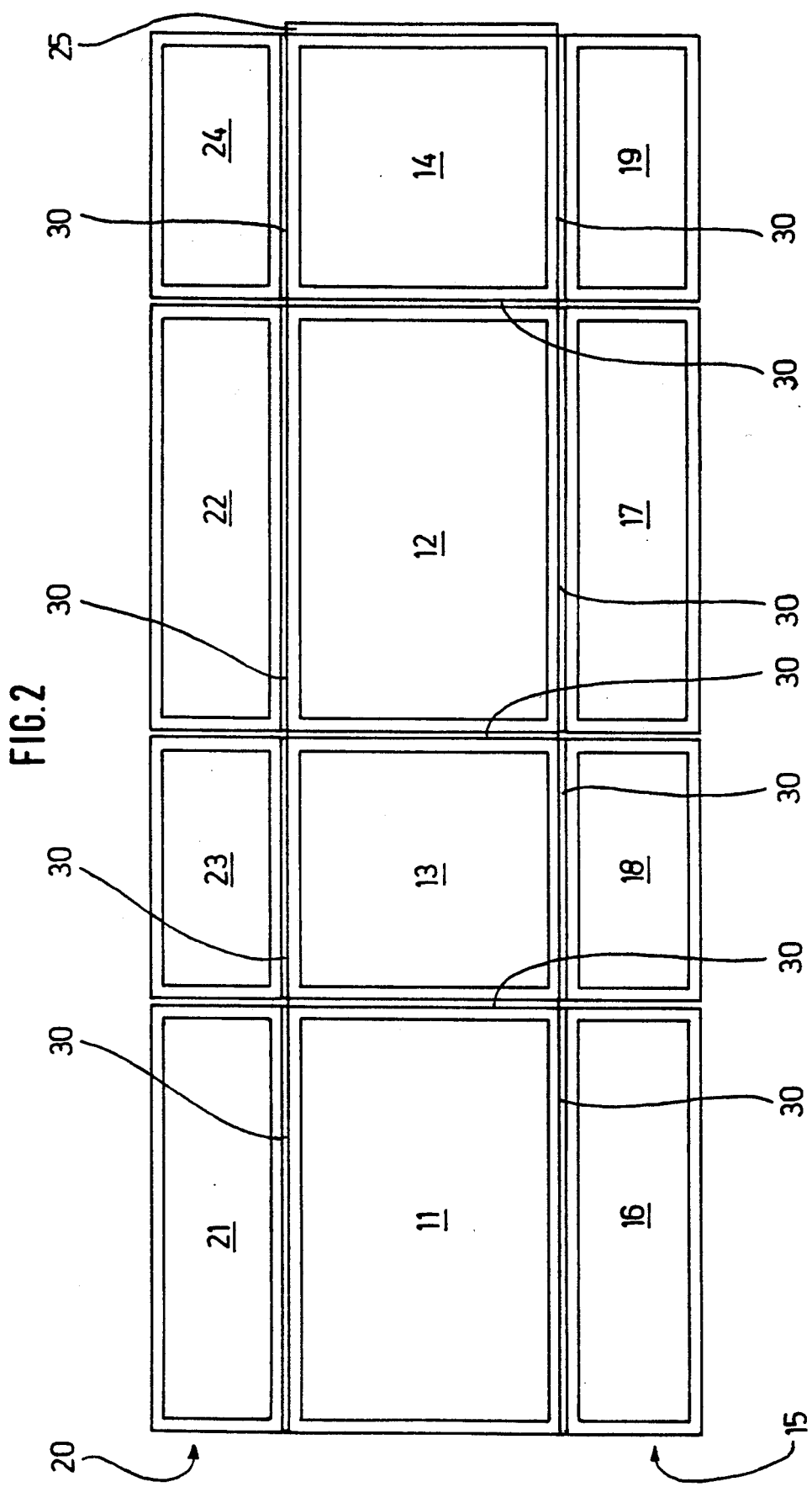

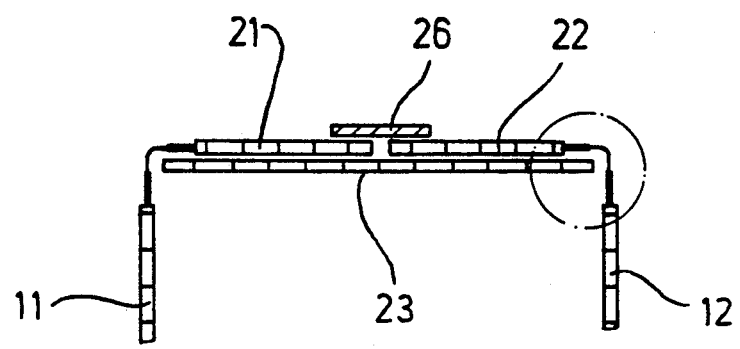
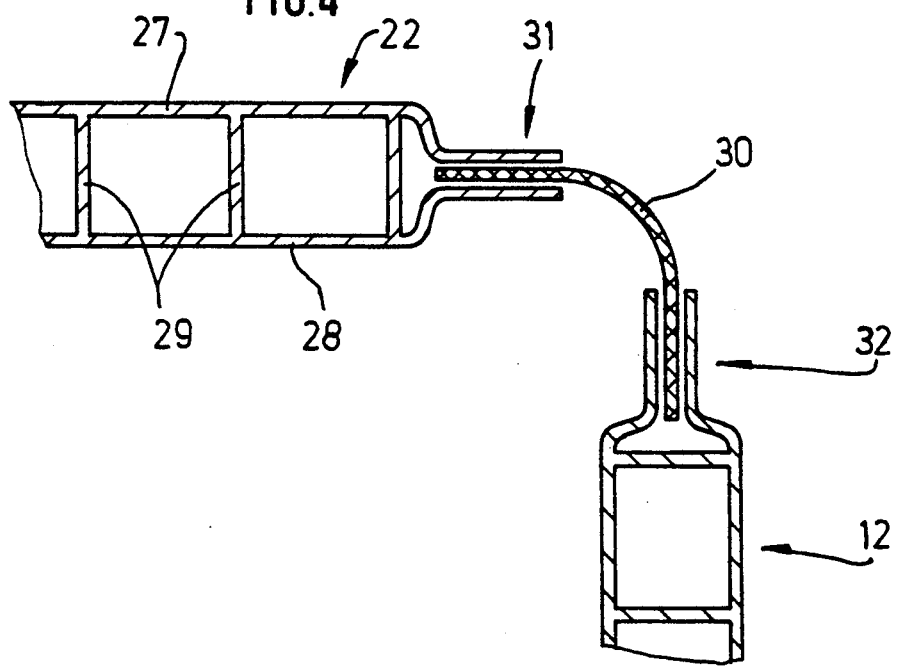

FOLDING CONTAINER

BACKGROUND OF THE INVENTION

The invention relates to a folding container having side walls, a bottom wall and a cover wall, the side walls, which consist of rigid material, being foldable at the (vertical) edges, in such a way that the open folding container can be folded flat, at least the side walls consisting of waterproof or water-repellent material, especially plastic.

An appreciable problem in packaging technology is what to do with used packaging material. To reduce the burden on refuse disposal and to safeguard resources, it is necessary to have packaging which can at least partially be put to multiple use. This implies some resistance and insensitivity to external influences, in order to allow multiple reuse of the packaging material. A precondition for this is, among other things, a cost-effective and space-saving return transport of the packaging. Furthermore, after it has been used for the last time, the packaging material should be recyclable, that is to say capable of being returned to the production process. The requirements mentioned apply particularly to large-bundle packaging for goods on their way from the producer to the dealer. It is precisely here where it is important to have a cost-effective rapid transport of robust packs. The largely conventional folding boxes made of paperboard (cardboard) are not sufficiently resistant for multiple reuse and moreover, after being employed, end up on the refuse tip (dump). or the preservation of especially sensitive commodities, it is already known to use foldable transport containers having Multi-ply and also waterproof walls. With these containers, the folding lines between walls connected to one another are formed by cross-sectional weakenings. A container of this type is shown in GB 1,583,324. This does not ensure that some waterproofing and therefore resistance is also provided in the region of the folding lines. Moreover, the production of controlled cross-sectional weakenings involves a very high outlay.

SUMMARY OF THE INVENTION

Against this background, the object of the present invention is to provide a folding container which is environmentally friendly, because of being multiply reusable, and which at the same time can be produced as simply as possible.

To achieve the object, the folding container according to the invention is characterised in that the individual walls, especially the side walls, are connected to one another in the region of the especially vertical edges by means of additional, likewise waterproof, elastic hinge strips. Only the formation of the additional waterproof hinge strips allows the desired high reusability in conjunction with a cost-effective production of the folding containers.

Other features of the invention relate to the construction of the folding container, the choice of material and special designs of the hinge strip and of the container walls.

Advantageous embodiments of the invention are explained in more detail below by means of drawings. In these:

BRIEF DESCRIPTION OF THE DRAWINGS

FIG. 1 shows a perspective representation of a folding container according to the invention;

FIG. 2 shows a top view of an unfolded folding container having side walls, a bottom wall, a cover wall and folding tabs;

FIG. 3 shows a cross-section through the upper part of the folding container according to FIG. 1;

FIG. 4 shows a representation of the connection between a side wall and folding tab on an enlarged scale according to FIG. 3;

DESCRIPTION OF THE PREFERRED EMBODIMENTS

Figure 5:
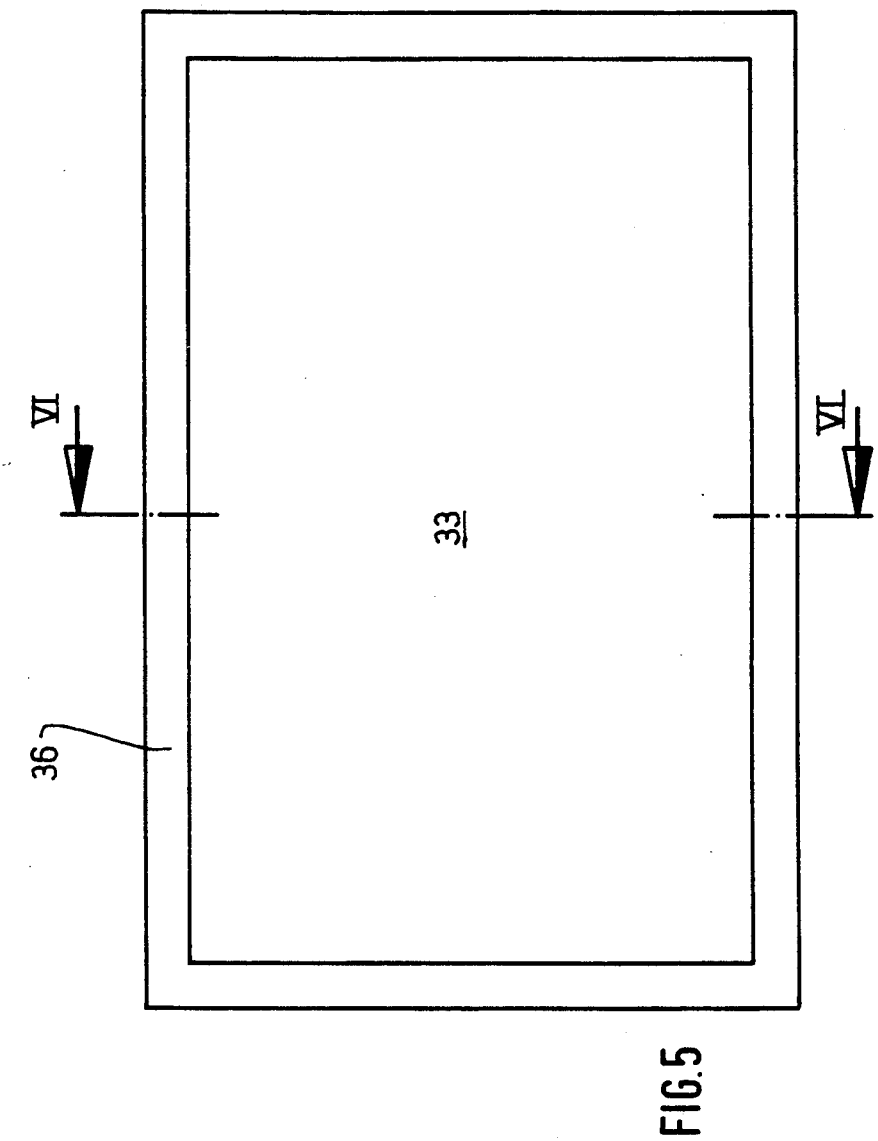
FIG. 5 shows a top view of a wall of the folding container according to the invention.

Reference is first made to FIGS. 1 and 2. A rectangular folding container 10 consists of two large side walls 11, 12 and two small side walls 13, 14. For forming a bottom wall 15 there are lower large folding tabs 16, 17 and small folding tabs 18, 19, which are respectively connected in an articulated manner to the side walls 11 to 14. Correspondingly, upper large and small, folding tabs 21 to 24 are provided for forming a cover (top) wall. There are, furthermore, articulated connections between the side walls 11 to 14.. In FIG. 2, a hinge strip 25 is indicated on the right on the small side wall 14. When the folding container 10 is in the spatially folded or laid-flat state, the small side wall 14 is always connected to the large side wall 11 by means of the hinge strip 25. According to FIG. 2, there are no connections or hinge strips between the folding tabs located next to one another. To close the folding container 10, in FIG. 1 there is an adhesive strip 26 which consists of recyclable material, for example paper, is equipped with a coating, and is provided in such a way that it can be pulled of f completely in order to open the folding container 10.

In another embodiment, the folding container 10 is equipped with a touch-and-close fastening which can, by its nature, be used repeatedly. The strip 26 is, for example, designed as a touch-and-close tape. Underneath said strip, that is to say covered by it and therefore not visible in FIG. 1, touch-and-close strips corresponding to the touch-and-close tape are then connected permanently to the walls 21, 22 or further walls.

The side walls 11 to 14 and, if appropriate, the folding tabs 16 to 19 and 21 to 24 consist of a rigid, waterproof or water-repellent material. FIGS. 3 and 4 show the special construction in cross-section. According to these, the walls (side walls and folding tabs) are formed by multi-ply cover boards. These are made of plastic and have two outer plies 27, 28 with intermediate webs 29 directed transversely to these. The latter are straight and thus allow a simple production of the (plastic) cover boards by extrusion.

FIG. 4 shows as a further special feature the connection between the upper large folding tab 22 and the large end wall 12 by means of a hinge strip 30. This consists of a fabric, especially made from plastic, which, if appropriate, is additionally coated with plastic. The hinge strip 30 is retained between continuous edges 31, 32 of the folding tab 22 and of the side wall 12. For a better connection, the edges 31, 32 of the walls are pressed or sealed together with the hinge strips under the effect of heat. Unless stated otherwise, the type of connection described between the folding tab 22 and the side wall 12 is also provided between the other walls. The hinge strips 30 are substantially elastic and allow the folding container 10 to be folded many times. The retention described between the outer plies 27, 28 in the region of the edges 31, 32 prevents the hinge-strip fabric from fraying.

The cover boards consist of polycarbonate. The use of polyamide and polypropylene is also especially advantageous in view of the reprocessing and the return to the production process. If the hinge strip 30 and the touch-and-close tape 26 consist of the same material as the walls (side walls, folding tabs), complete recyclability of the folding container 10 is afforded.

Figure 7:
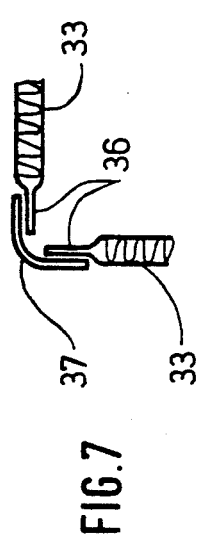
FIG. 7 shows a particular possibility for the connection of two walls, similar to that of FIG. 4.
Figure 6:
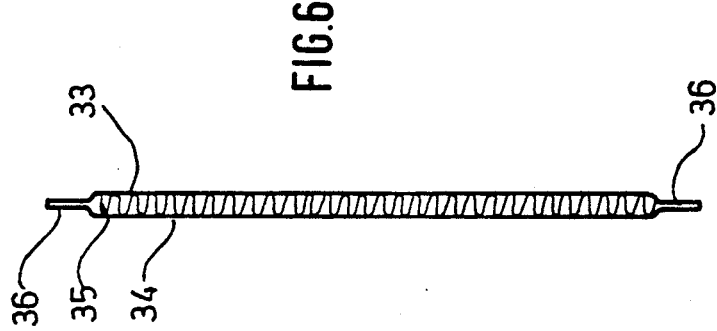
FIG. 6 shows a cross-section of the wall according to FIG. 5 along the line VI—VI.
Figure 8:
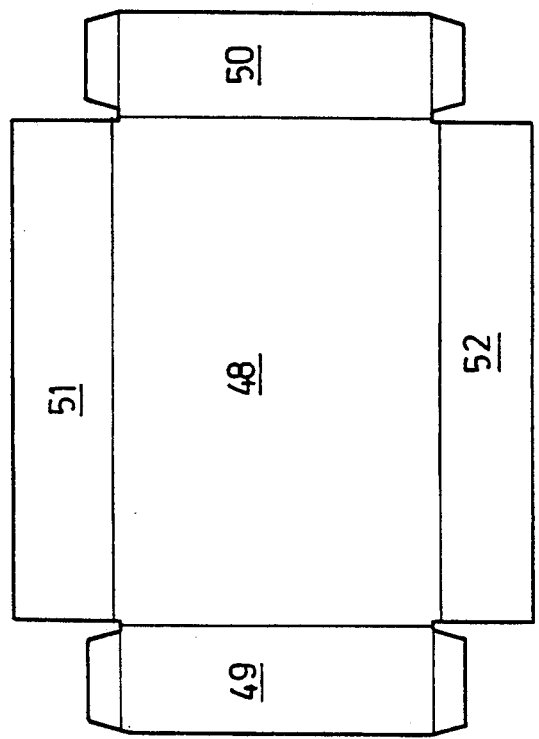
FIG. 8 shows a top view of a blank for one part of a multipart folding container.

FIGS. 5, 6 and 7 show a further version of a wall (side wall, folding tab) for a folding container according to the invention. The wall has two outer layers 33, 34 of high-density stable film, between which a thicker stiffening ply 35 consisting of a material of lower dead weight is arranged. In the edge region 36, the two outer layers 33, 34 are connected to one another firmly and in a liquid-tight manner, for example by adhesive bonding or welding. The same also applies to the outer plies 27, 28 in the region of their edges 31, 32. The stiffening ply 35 consists of a foam plastic or, as shown in FIG. 6, of a corrugated or zigzag-shaped film and is preferably connected to the outer layers 33, 34 by adhesive bonding or sealing. FIG. 7 shows a special type of connection similar to the connection according to FIG. 4. In FIG. 7, a hinge strip 37 for connecting two walls is respectively pressed onto the edge regions 36 on the outside, and is adhesively bonded or sealed together with these. The connection thus formed constitutes at the same time an edge protection. According to an embodiment not shown, the types of connection according to FIG. 4 and FIG. 7 are combined. A double-sided hinge strip on both sides of the edge regions 36 according to FIG. 7 is also possible. As regards the choice of material, the same applies as was previously stated in respect of FIGS. 1 to 4.

Figure 9:
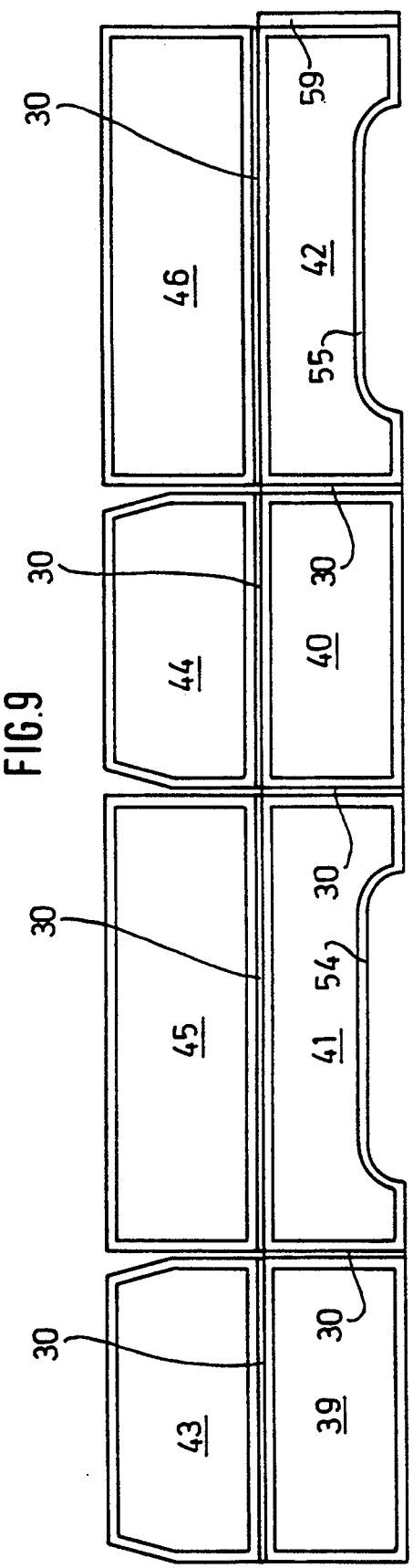
FIG. 9 shows a top view of an unfolded further part fitting with that shown in FIG. 8.
Figure 10:
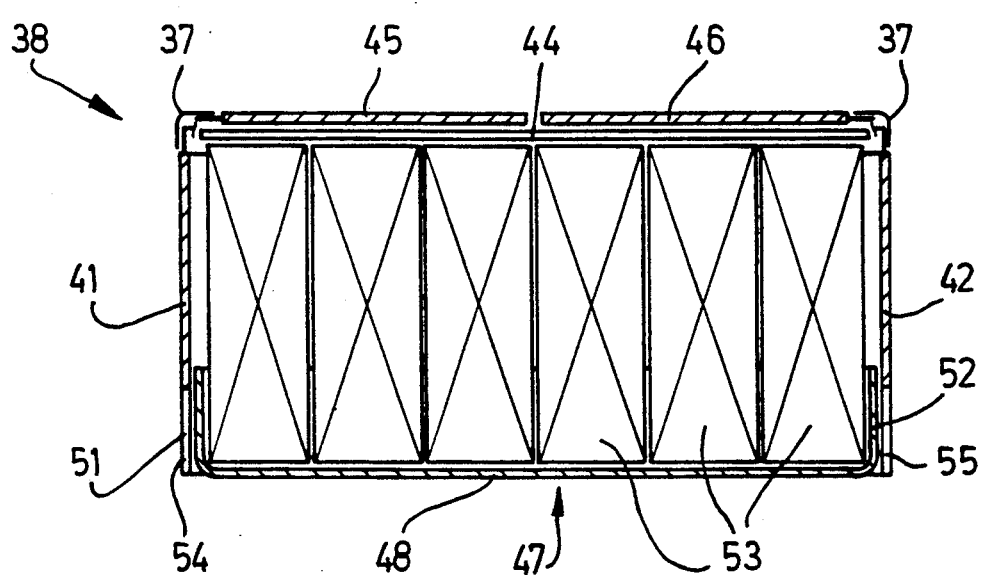
FIG. 10 shows a cross-section through a multipart folding container having parts according to FIGS. 8 and 9.
Figure 11:
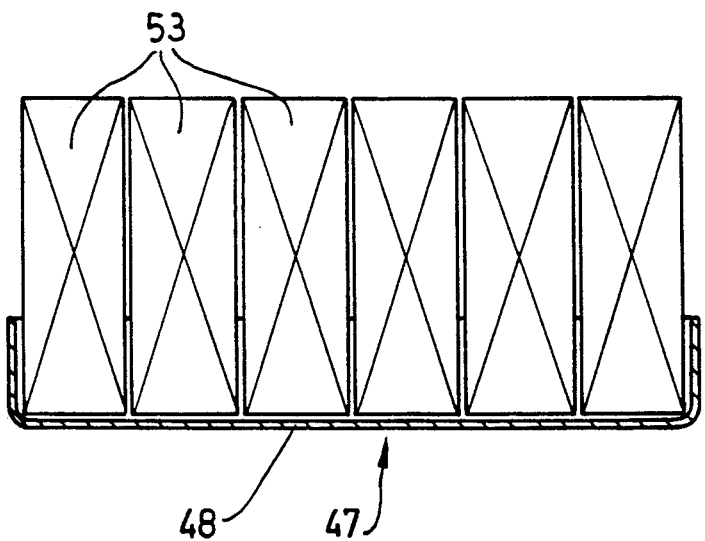
FIG. 11 shows a cross-section corresponding to that of FIG. 10, but with only the lower part and the inserted commodities for packaging being represented.

FIGS. 8 to 11 show a special two-part embodiment of a folding container according to the invention. In a similar way to FIG. 2, a spread-out representation of a rectangular folding container 38 having two small side walls 39, 40 and two large side walls 41, 42 can be seen in FIG. 9. Upper folding tabs 43 to 46 adjoin the side walls in the upward direction. The walls (side walls and folding tabs) and the connections between these correspond in construction to one or more of the embodiments described previously. The second part of the folding container 38 consists of a so-called tray, such as can be produced, for example, by means of a blank according to FIG. 8. According to FIG. 8, the tray 47 has a bottom wall 48 with side rims 49 to 52 adjoining it all-round. FIGS. 10 and 11 show the tray 47 in cross-section in the folded position with the commodities for packaging, in this case a plurality of small packs 53, inserted. The size of the tray 47 is such that the side rims 49 to 52 come to rest within the side walls 39 to 42 (FIG. 10). A particular feature of this embodiment is that the part of the folding container 38 described in conjunction with FIG. 9 is needed essentially for transport and circulates accordingly between the manufacturer and the trade. The tray 47 serves as a permanent receptacle for the packs 53, is for this purpose preferably produced from paperboard and can be used at the same time as a presentation aid, for example in the retail trade. The packs 53 are arranged on edge within the tray 47, so that the part of the folding container 38 located at the top in FIG. 10 can, if appropriate after the release of an adhesive bond, be lifted off upwards easily and without taking up a pack. For this purpose, the large side walls 41, 42 are provided with easy-grip clearances 54, 55 in the region of their lower edges.

In an embodiment not shown, a folding container according to the invention is equipped with a double tray. In this respect, the folding container consists of one tray each for the bottom and the cover and of intermediate reusable side walls connected to one another.

Figure 12:
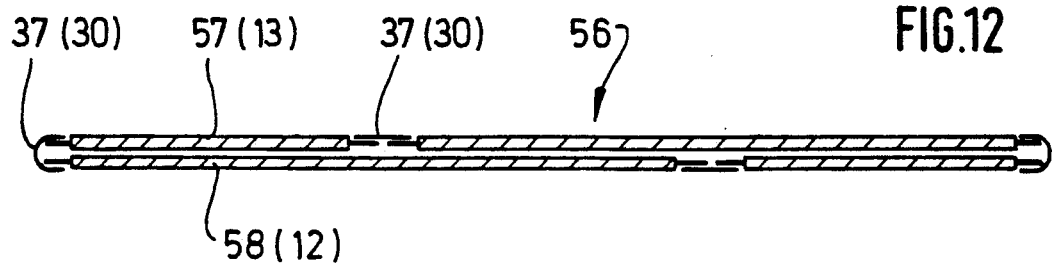
FIG. 12 shows a folding container according to the invention in the folded-flat state.

FIG. 12 shows a folding container 56 in the laid-flat state, as is assumed for return transport or else before filling. The filling of the folding containers (this is also true of the folding containers 10 and 38) takes place in the customary way. The laid-flat containers are fed in stacks to a packaging machine, grasped individually, held on mutually opposite, subsequently adjacent side walls 57, 58 and drawn apart to form a rectangular case. The commodities for packaging, for example smaller packs, can now be introduced into this. An apparatus which can be employed for this is described by way of example in DE 3,429,761 A1.

The folding containers 38 with tray 47 are filled in a special way. For this, the part of the folding container 38 according to FIG. 9 is folded in the way described previously to form a rectangular case. The large side wall 42 is connected to the small side wall 39 by means of a hinge strip 59. The packs 53 are deposited on the bottom wall 48 of the tray 47 and introduced, together with this, into the open case. An upward folding of the side rims 49 to 52 can take place before the introduction or else simultaneously with it. In the last-mentioned case, the folding round of the side rims 49 to 52 takes place by bearing contact against the upper folding tabs 43 to 46. These are thereafter folded onto the packs 53.

We claim:
1. A folding container comprising:
   side walls, a bottom wall and a cover wall, the side walls consisting of rigid material and being foldable at vertical edges in such a way that an open folding container can be folded flat, said rigid material being waterproof or water-repellent; and
   waterproof elastic hinge strips (30) connecting adjacent ones of said side walls to one another at the vertical edges;
   wherein the bottom wall (15) and cover wall (20) are formed from folding tabs (16 to 19; 21 to 24) arranged at upper and lower free edges of the side walls (11 to 14), the folding tabs also consisting of waterproof or water-repellent material and being pivotally connected to the side walls (11 to 14) via waterproof elastic hinge strips (30) in such a way that the open folding container (10) can be folded flat; and wherein the side walls (11 to 14; 39 to 42) have outer layers (33, 34) of high-density films between which a thicker stiffening ply (35), consisting of a material of lower dead weight, is arranged.

2. Folding container according to claim 1, characterised in that the stiffening ply (35) consists of a corrugated or zigzag-shaped film which is connected to the outer layers (33, 34) by adhesive bonding or sealing.

3. Folding container according to claim 1 or 2, characterised in that the stiffening ply (35) consists of foam plastic.

4. A folding container comprising:

side walls, a bottom wall and a cover wall, the side walls consisting of rigid material and being foldable at vertical edges in such a way that an open folding container can be folded flat, said rigid material being waterproof or water-repellent; and waterproof elastic hinge strips (30) connecting adjacent ones of said side walls to one another at the vertical edges;

wherein at least one of the bottom wall (15) and the cover wall (20) is formed from folding tabs (16 to 19; 21 to 24) arranged at upper and lower free edges of the side walls (11 to 14), the folding tabs also consisting of waterproof or water-repellent material and being pivotally connected to the side walls (11 to 14) via waterproof elastic hinge strips (30) in such a way that the open folding container (10) can be folded flat; and wherein said side walls (11 to 14; 39 to 42) are of multi-ply design, and the elastic hinge strips (30) are embedded between two outer plies (27, 28) of the side walls; and wherein said outer plies (27, 28; 33, 34) are pressed together with one another at ply edges thereof in such a way that the ply edges are made liquid-tight.

5. Folding container according to claim 4, characterised in that the hinge strips (25, 30, 37, 59) consist of plastic with a reinforcing insert made of textile fabric.

6. Folding container according to claim 4 or 5, characterised in that the hinge strips (25, 30, 37, 59) are connected to a surface of the side walls (11 to 14; 39 to 42) by a heat-seal or an adhesive bonding.

7. Folding container according to claim 4, characterised in that the hinge strip (25, 30, 37, 59) consist of a material which is the same as that of the side walls.

8. Folding container according to claim 4, characterized in that at least one of the bottom wall (15) and cover wall (20) consists of a separate blank (47) made of cardboard or paper and is releasably connected to at least one of the side walls (39 to 42) of the folding container (38).

9. Folding container according to claims 4, 5 or 8, characterised in that at least the bottom wall (25) is designed as a tray (47) having continuous side rims (49 to 52) bearing against a surface of the side walls (39 to 42) and being releasably connected thereto.

10. Folding container according to claim 4 or 7, wherein said material is polypropylene or polyamide.

11. Folding container according to claim 4, comprising a recyclable adhesive strip (26) for fastening said sidewalls and said folding side tabs and which can be completely pulled off the container.

12. Folding container according to claim 4, comprising a touch-and-close tape (26) for fastening said folding walls and said side tabs and which can be used repeatedly.

13. Folding container according to claim 12, further comprising touch-and-close strips which are permanently fixed to said sidewalls and said folding tabs and which are located to mate with said touch-and-close tape.

14. A folding container comprising:

side walls, a bottom wall and a cover wall, the side walls consisting of rigid material and being foldable at vertical edges in such a way that an open folding container can be folded flat, said rigid material being waterproof or water-repellent; and waterproof elastic hinge strips (30) connecting adjacent ones of said side walls to one another at the vertical edges;

wherein the bottom wall (15) and cover wall (20) are formed from folding tabs (16 to 19; 21 to 24) arranged at upper and lower free edges of the side walls (11 to 14), the folding tabs also consisting of waterproof or water-repellent material and being pivotally connected to the side walls (11 to 14) via waterproof elastic hinge strips (30) in such a way that the open folding container (10) can be folded flat;

wherein the side walls are of multi-ply design with two outer plies;

wherein intermediate webs (29) are disposed between the two outer plies (27, 28) and are directed transversely thereto; and wherein said outer plies (27, 28; 33, 34) are pressed together with one another at ply edges thereof in such a way that the ply edges are made liquid-tight.

* * * * *